United States Patent [19]

Fujiki et al.

[11] Patent Number: 4,810,439
[45] Date of Patent: Mar. 7, 1989

[54] PROCESS FOR PRODUCING POTASSIUM HEXATITANATE FIBERS

[75] Inventors: Yoshinori Fujiki; Takefumi Mitsuhashi, both of Sakura, Japan

[73] Assignee: National Institute for Researches in Inorganic Materials, Ibaraki, Japan

[21] Appl. No.: 891,425

[22] Filed: Aug. 4, 1986

Related U.S. Application Data

[63] Continuation of Ser. No. 637,827, Aug. 6, 1984, abandoned.

[30] Foreign Application Priority Data

Aug. 4, 1983 [JP] Japan ................................ 58-142785
Aug. 30, 1983 [JP] Japan ................................ 58-158688
Jun. 1, 1984 [JP] Japan ................................ 59-113723

[51] Int. Cl.$^4$ ............................................. C01G 23/00
[52] U.S. Cl. ........................................ 264/42; 264/49; 423/598
[58] Field of Search .................... 264/49, 42; 423/598

[56] References Cited

U.S. PATENT DOCUMENTS 3,328,117  6/1967  Emslie et al. ........................ 423/598
4,265,872  5/1981  Fujiki .................................. 423/598

*Primary Examiner*—James Derrington
*Attorney, Agent, or Firm*—Oblon, Fisher, Spivak, McClelland & Maier

[57] ABSTRACT

A process for producing potassium hexatitanate fibers having a tunnel structure, which comprises mixing a titanium component represented by the general formula (Ti, M)$O_2$ where M is metal impurities with a potassium component selected from the group consisting of potassium oxide, potassium compounds capable of forming potassium oxide when heated and a mixture thereof, to obtain a mixture represented by the general formula $K_2O \cdot n(Ti, N)O_2$ where n is from 1.5 to 2.5 and M is as defined above; heating the mixture to obtain a melt; forming from the melt a fibrous material having a layered crystalline structure corresponding to potassium dititanate ($K_2O \cdot 2TiO_2$); leaching a part of $K_2O$ from the fibrous material; and heating the fibrous material at a temperature of at least 800° C. and lower than the melting point of the fibrous material.

5 Claims, No Drawings

PROCESS FOR PRODUCING POTASSIUM HEXATITANATE FIBERS

This application is a continuation of application Ser. No. 637,827, filed Aug. 6, 1984, now abandoned.

BACKGROUND OF THE INVENTION

1. Field of the Invention

The present invention relates to a process for producing potassium hexatitanate fibers or composite fibers having excellent heat resistance, heat-insulating property, chemical resistance and reinforcing property.

2. Description of the Prior Art

Heretofore, fibrous potassium hexatitanate $K_2Ti_6O_{13}$ has been known as a heat resistant heat-insulating material. For the production of potassium hexatitanate fibers, there have been proposed:

(1) a method wherein by means of a flux, a primary phase of potassium tetratitanate fibers is grown in a molten material, followed by treatment for partial removal of potassium and heat treatment to obtain potassium hexatitanate fibers;

(2) a method wherein without using any flux, a mixture of potassium tetratitanate fibers and potassium dititanate fibers is formed as the primary phase by utilizing the incongruent melting-and-association reaction of potassium tetratitanate, followed by treatment for partial removal of potassium and heat treatment to obtain potassium hexatitanate fibers; and (3) a method wherein potassium dititanate fibers are grown by utilizing the congruent melting of low melting point potassium dititanate, followed by treatment for partial removal of potassium and heat treatment to obtain potassium hexatitanate fibers.

However, in each of these methods, titanium dioxide used as the starting material is a highly pure product at a level of at least 99% produced by treating ilmenite by a sulfuric acid method or chlorine method. Accordingly, the cost for the starting material is high, and it adds to the cost of the final product.

SUMMARY OF THE INVENTION

It is an object of the present invention to overcome the above difficulty and to provide a process for producing potassium hexatitanate fibers having excellent heat resistance and heat insulating property at a low cost.

In an attempt to accomplish the above object, the present inventors have studied the applicability of the conventional methods by using natural rutile sand or anatase sand as an inexpensive titanium material. As a result, it has been found that in each of the flux method and the gradual cooling and burning method, although potassium tetratitanate fibers form as the primary phase, such fibers will be adversely affected by the impurities contained in the titanium material and tend to form a dense aggregate at the bottom of the crucible, whereby it is hardly possible to separate the aggregate into fibers. Whereas, in the melting method, no adverse effects of the impurities in the titanium material were observed, and such impurities have been found to present favorable influences, whereby the melting can be facilitated and excellent potassium hexatitanate fibers can readily be obtained. The present invention has been accomplished based on these discoveries.

Namely, the present invention provides for producing potassium hexatitanate fibers having a tunnel structure, which comprises mixing a titanium component represented by the general formula $(Ti, M)O_2$ where M is metal impurities with a potassium component selected from the group consisting of potassium oxide, potassium compounds capable of forming potassium oxide when heated and a mixture thereof, to obtain a mixture represented by the general formula $K_2O.n(Ti, M)O_2$ where n is from 1.5 to 2.5 and M is as defined above; heating the mixture to obtain a melt; forming from the melt a fibrous material having a layered crystalline structure corresponding to potassium dititanate ($K_2O.2TiO_2$); leaching a part of $K_2O$ from the fibrous material; and heating the fibrous material at a temperature of at least 800° C. and lower than the melting point of the fibrous material.

DETAILED DESCRIPTION OF THE INVENTION

Now, the present invention will be described in detail with reference to the preferred embodiments.

As the titanium component, natural rutile sand or anatase sand is used. The natural rutile sand or anatase sand may be used in combination with upto 3 parts by weight of a titanium slag produced during the production of pig iron from ilmenite.

The natural rutile sand to be used in the present invention is obtainable in the form of sand from a plaser, and it comprises about 95% of $TiO_2$, and impurities such as $Fe_2O_3$, $Al_2O_3$, $Cr_2O_3$, $SiO_2$, $Nb_2O_5$, $ZrO_2$ and $V_2O_5$. The contents of the impurities are, for example, 0.6% of $Fe_2O_3$, 0.4% of $Al_2O_3$, 0.3% of $Cr_2O_3$, 0.6% of $SiO_2$, 0.3% of $Nb_2O_5$, 0.7% of $ZrO_2$ and 0.7% of $V_2O_5$. The natural anatase sand has substantially the same composition. However, from the viewpoint of resources, the rutile sand is more abundant than the anatase sand, and is preferably used. The smaller the particle size, the greater the reactivity. Thus, it is preferred to use the sand having smaller particle size.

As the potassium component, there may be mentioned potassium oxide or a potassium compound capable of forming $K_2O$ when heated, such as KOH, $K_2CO_3$ or $KHCO_3$.

The titanium component is then mixed with the potassium component in a ratio to provide a mixture represented by the general formula of $K_2O.n(Ti, M)O_2$ whereby n is from 1.5 to 2.5 and M is metal impurities. This mixture is melted at a temperature of about 1100° C. to obtain a melt. When the melt is cooled and solidified, fibrous crystalline material having a layered structure is formed.

In the above mixture, if n is less than 1.5, it becomes difficult to obtain the layered structure. On the other hand, if n exceeds 2.5, not only the melting point tends to be high, but also potassium titanate having a composition of $K_2Ti_4O_9$ will be formed, whereby it becomes difficult to separate fibers. Thus, n should be within a range of from 1.5 to 2.5, preferably about 2. In the case where the titanium slag is used in combination with the natural rutile sand or anatase sand, it is used in an amount of at most 3 parts by weight relative to one part by weight of the natural rutile sand or anatase sand. If the amount of the titanium slag exceeds the upper limit, the amount of the impurities tends to be too much to obtain a fibrous crystalline material having the same layered structure as potassium dititanate.

As the method for forming fibers, there may be employed (1) a melt spinning method, e.g. a method similar to the one employed for forming glass fibers, (2) a method wherein the melt is poured into another container, (3) a method of quenching the bottom of the crucible, or (4) a method of blowing high pressure steam to a melt flowing out from a pushing by a steam blowing method.

When cooled and solidified in the form of a fibrous material, the melt gives a potassium titanate represented by the formula $K_2O.2(Ti, M)O_2$ where M is as defined above, which is a crystalline fibrous potassium titanate having a layered structure.

The fibrous materials is then treated with water for leaching a part of $K_2O$ from the fibrous material to obtain $K_2(Ti, M)_6O_{13}$. Namely, by the treatment with water, a part of a $K_2O$ component in the fibrous material is leached out to obtain a fibrous material having a composition of $K_2O.6TiO_2$ containing metal impurities (M).

This leaching treatment may be conducted with cool water, hot water or boiling water. In general, when treated with cool water, a single phase of potassium hexatitanate will be obtained. Whereas, when treated with hot water or boiling water, composite fibers of potassium hexatitanate are obtainable. For instance, in order to obtain highly crystalline composite fibers of rutile-priderite-potassium titanate, the fibrous material is treated in a boiling water for from 2 to 3 hours, followed by the heating treatment which will be described below.

After leaching a part of the potassium component, the fibrous material is then heated at a temperature of at least 800° C. and less than the melting point of the fibrous material, whereby the layered structure turns into a tunnel structure, and highly crystalline fibers of potassium hexatitanate are obtainable. The heating temperature is required to be lower than the melting point (rutile: 1840° C., priderite: about 1500° C., and potassium hexatitanate: 1370° C.), and preferably about 1000° C.

The impurities contained in the natural rutile sand or anatase sand, particularly $Fe_2O_3$, $Al_2O_3$ and $Cr_2O_3$ are effectively utilized as the constituting elements of priderite represented by the formula $K_x(M_x^{III}Ti_{8-x})O_{16}$ 8-x where M is Fe, Al, Cr or Ga, and x is $1.5<x<2$. Namely, they occupy the site of $M^{III}$.

In the case where a mixture of the titanate slag and the rutile sand or anatase sand is used, the iron content increases as the weight ratio of the titanate slag to the rutile or anatase sand increases from 1:1 to 3:1, and consequently the priderite phase ($K_2M_2^{III}Ti_6O_{16}$ where M is mainly Fe) will increase in the final product. This indicates that when the iron content as an impurity increases, the priderite phase is likely to form. The priderite-potassium hexatitanate composite fibers have a particularly small heat transfer coefficient and thus provide excellent heat resistance and heat-insulating property. Further, if the weight ratio is smaller than 1:1, composite fibers of priderite-potassium hexatitanate-rutile are obtainable. In this case, the heating temperature is preferably at about 1100° C.

Now, the present invention will be described in further detail with reference to the preferred embodiments. However, it should be understood that the present invention is by no means restricted by these specific Examples.

EXAMPLE 1

A rutile sand (NS-grade from Associated Minerals Consolidated Limited) composed of 95.6% of $TiO_2$, 0.6% of $Fe_2O_3$, 0.7% of $ZrO_2$, 0.6% of $SiO_2$, 0.3% of $Cr_2O_3$, 0.7% of $V_2O_5$, 0.3% of $Nb_2O_5$ and 0.4% of $Al_2O_3$ and having a particle size of from 100 to 60 μm and $K_2CO_3$ (powder) were mixed in a molar ratio of 2:1. About 6 g of this mixture was placed in a 30 ml platinum crucible and heated at 1100° C. for 30 minutes to obtain a melt. The crucible containing the melt was placed on an iron plate cooled with water and the bottom of the crucible was rapidly cooled, whereby the melt was solidified and formed into fibers. The fibers had a crystalline form having a composition of $K_2O.2(Ti, M)O_2$ where M is metal impurities. The crucible was immersed in 1 liter of water for 2 hours, whereupon fibers having a composition of $K_2(Ti, M)_6O_{13}$ were separated. The fibers were further washed with 1 liter of water, and dried at 120° C. The dried fibers were subjected to heating treatment at 1000° C. for 3 hours.

The obtained fibers were in the form of a bundle of fibers having a length of from 2 to 5 mm and a diameter of from 0.01 to 0.2 mm. From the X-ray powder diffraction, they were identified to be a single phase of highly crystalline potassium hexatitanate.

EXAMPLE 2

Fibers were prepared in the same manner as in Example 1 except that the potassium leaching treatment was conducted by dipping the washed fibers in 1 liter of boiling water for 30 minutes and the heating treatment was conducted at 1000° C. for 1 hour. The fibers thereby obtained had a length of from 2 to 5 mm and a diameter of from 0.01 to 0.2 mm. From the X-ray powder diffraction, they were found to be mixed phases of rutile, priderite and potassium hexatitanate.

The heat transfer coefficients of the respective mixed phases at room temperature were 0.104 $(W.cm^{-1}.K^{-1})$ in the case of rutile, 0.029 $(W.cm^{-1}.K^{-1})$ in the case of priderite such as $K_2Al_2Ti_6O_{16}$ and 0.037 $(W.cm^{-1}.K^{-1})$ in the case of potassium hexatitanate. Thus, the heat transfer coefficients are all relatively small. Even in a composite phase, the fibers have a small heat transfer coefficient and thus superior in the heat-insulating property.

The proportions of the respective phases vary depending upon the amount of potassium and the amounts of the impurities, and can be adjusted by controlling the potassium leaching treatment.

Further, natural anatase may be treated in the same manner as above to obtain composite fibers.

EXAMPLE 3

The same rutile sand as used in Example 1 and a titanium slag obtained during the process for the production of pig iron from ilmenite (produced in South Africa) and composed of 85% of $TiO_2$ and major impurities being 10% of $Fe_2O_3$, 2% of $SiO_2$, 1.5% of $MnO_2$ and 0.2% of $Nb_2O_5$.

The titanium slag and the rutile sand were mixed in a weight ratio of 1:1 to obtain a mixture having a composition of $(Ti, M)O_2$ where M is metal impurities. This mixture and $K_2CO_3$ powder were mixed in a molar ratio of 2:1 (6.5 g:5.5 g) i.e. $(Ti, M)O_2:K_2CO_3=2:1$. About 11.9 g of the mixture thus obtained was placed in a 30 ml platinum crucible and heated at 1100° C. for 30 minutes to obtain a melt. This crucible was left to cool on a hot iron plate of 120° C., whereby the melt was solidified and formed into fibers. The fibers were a crystalline form having a composition of $K_2O.2(Ti, M)O_2$ where M is metal impurities composed mainly of Fe. The crucible was immersed in 1 liter of cool water to separate fibers. The fibers were treated twice with 1 liter $H_2O/10$ g for 12 hours for the potassium leaching treatment. Then, they were dried at 120° C., and then heated at 1000° C. for 1 hour, whereby fibers were obtained. The obtained fibers had a length of from 2 to 5 mm and a diameter of from 0.01 to 0.2 mm. From the X-ray powder diffraction, they were identified to be highly crystalline potassium hexatitanate.

EXAMPLE 4

By using the same materials as in Example 3, the titanium slag was mixed with the rutile sand in a weight ratio of 1:3.

The mixture was treated in the same manner as in Example 3 to obtain fibers. The obtained fibers were in the form of a bundle of fibers having a length of from 2 to 5 mm and a diameter of from 0.01 to 0.2 mm. From the X-ray powder diffraction, they were identified to be highly crystalline potassium hexatitanate.

EXAMPLE 5

By using the same materials as in Example 3, the titanium slag was mixed with the rutile sand in a weight ratio of 3:1. Then, the mixture was treated in the same manner as in Example 3 to obtain fibers. The obtained fibers were in the form of a bundle of fibers having a length of from 1 to 2 mm and a diameter of from 0.01 to 0.1 mm. From the X-ray powder diffraction, they were identified to be mixed phase composite fibers comprising highly crystalline potassium hexatitaate and a small amount of priderite ($K_2M_2^{III}Ti_6O_{16}$), thsu indicating that as the amount of the titanium slag increases, the iron content increases and the priderite phase tends to be readily formed.

EXAMPLE 6

By using the same materials as in Example 3, the titanium slag was mixed with the rutile sand in a weight ratio of 1:1. Then, the mixture was placed in a crucible, and crystalline fibers having a composition of $K_2O.2(Ti, M)O_2$ were prepared in the same manner as in Example 3. The crucible was immersed in 1 liter hot water for 2 hours to separate fibers. The fibers were washed with 1 liter of water, and then immersed in 1 liter of boiling water for 1 hour to remove a part of potassium. Then, the fibers were washed with water and dried at 120° C. The dried fibers were heated at 1100° C. for 1 hour. The obtained fibers were in the form of a bundle of fibers having a length of from 2 to 3 mm and a diameter of from 0.01 to 0.2 mm. From the X-ray powder diffraction, they were identified to be composite fibers of highly crystalline priderite-potassium hexatitanate. The composite fibers had a particularly small heat transfer coefficient and thus had an excellent heat-insulating property. The heat transfer coefficient of the sintered product prepared by pulverizing the composite fibers was 0.025 ($W.cm^{-1}.K^{-1}$) at room temperature.

The proportions of the respective phases vary depending upon the mixing ratio of the titanium slag with the rutile sand, the contents of the impurities therein and the amount of potassium carbonate. The proportions of the respective phases can be adjusted by controlling the potassium leaching treatment so long as the compositions of the starting materials are the same.

Composite fibers are obtainable in the same manner as above by using natural anatase sand instead of the natural rutile sand.

EXAMPLE 7

By using the same materials as used in Example 3, the titanium slag was mixed with the rutile sand in a weight ratio of 1:3. Then, the mixture was treated in the same manner as in Example 6 to obtain fibers. The obtained fibers were in the form of a bundle of fibers having a length of from 2 to 5 mm and a diameter of from 0.01 to 0.2 mm. From the X-ray powder diffraction, they were identified to be composite fibers of highly crystalline priderite-potassium hexatitanate-rutile.

The formation of the rutile phase is believed attributable to the fact that the mixing ratio of the titanium slag was small, the iron component contained therein became small, and consequently the formation of the prederite phase decreased, whereby the rutile phase was formed. The rutile phase has high heat resistance (melting point: 1840° C.), and thus the composite fibers of priderite-potassium hexatitanate-rutile have excellent heat-insulating property. The heat transfer coefficient of a sintered body prepared by the pulverization of the composite fibers was 0.035 ($W.cm^{-1}.K^{-1}$) at room temperature.

EXAMPLE 8

By using the same materials as in Example 3, the titanium slag was mixed with the rutile sand in a weight ratio of 3:1. Then, fibers were prepared in the same manner as in Example 6. The obtained fibers were in the form of a bundle of fibers having a length of from 1 to 2 mm and a diameter of from 0.01 to 0.1 mm. From the X-ray powder diffraction, the fibers were identified to be highly crystalline priderite-potassium titanate composite fibers.

Having thus described the invention, it should be apparent that according to the process of the present invention, inexpensive natural rutile sand or anatase sand is used per se as the starting material for the titanium component, whereby the cost for the starting material can be reduced to about 1/10 as compared with the conventional methods. Thus, it is possible to obtain highly crystalline potassium hexatitanate fibers or composite fibers at low costs.

In the case where the titanium slag is used in combination with the natural rutile sand or anatase sand, the cost for the starting materials can further be reduced to about 1/12 as compared with the conventional methods.

Furthermore, the impurities contained in the titanium materials can effectively be used to provide potassium hexatitanate composite fibers having superior heat resistance and heat-insulating property.

What is claimed is:

1. A process for producing potassium hexatitanate fibers having a tunnel structure, which comprises mixing a titanium component represented by the general formula (Ti, M)$O_2$ where M is metal impurities present in a content of 3.6–12.5% with a potassium component selected from the group consisting of potassium oxide, potassium compounds capable of forming potassium oxide when heated and a mixture thereof, to obtain a mixture represented by the general formula $K_2O.n(Ti, M)O_2$ where n is from 1.5 to 2.5 and M is as defined above; heating the mixture to obtain a melt; forming from the melt a fibrous material having a layered crystalline structure corresponding to potassium dititahate ($K_2O.2TiO_2$); leaching a part of $K_2O$ from the fibrous material; and heating the fibrous material at a temperature of at least 800° C. and lower than the melting point of the fibrous material.

2. The process according to claim 1, wherein the titanium component is natural rutile sand or anatase sand.

3. The process according to claim 1, wherein the titanium component is a mixture comprising at most 3 parts by weight of a titanium slag produced during the production of pig iron from ilmenite and 1 part by weight of natural rutile sand or anatase sand.

4. The process according to claim 1, wherein the fibrous material is immersed in boiling water for the leaching treatment, followed by the heating treatment to obtain rutile-priderite-potassium hexatitanate composite fibers.

5. The process according to claim 1, wherein the fibrous material is treated with water for the leaching treatment to obtain $K_2(Ti, M)_6O_{13}$, followed by the heating treatment to obtain potassium hexatitanate fibers.